United States Patent
Small et al.

(10) Patent No.: US 10,467,910 B2
(45) Date of Patent: *Nov. 5, 2019

(54) FLIGHT SCHEDULE DISRUPTION AWARENESS SYSTEMS AND METHODS

(71) Applicant: THE BOEING COMPANY, Chicago, IL (US)

(72) Inventors: Gregory John Small, Federal Way, WA (US); Goran Stojkovic, Aurora, CO (US); Frank R. Morales, Montreal (CA); Peter Douglas Cornett, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/703,053

(22) Filed: Sep. 13, 2017

(65) Prior Publication Data

US 2019/0080618 A1    Mar. 14, 2019

(51) Int. Cl.
*G08G 5/00*    (2006.01)
*G06Q 10/06*    (2012.01)

(52) U.S. Cl.
CPC ....... *G08G 5/0026* (2013.01); *G06Q 10/0631* (2013.01); *G08G 5/0013* (2013.01); *G08G 5/0039* (2013.01); *G08G 5/0043* (2013.01); *G08G 5/0082* (2013.01); *G08G 5/0021* (2013.01)

(58) Field of Classification Search
CPC .. G08G 5/0026; G08G 5/0013; G08G 5/0021; G08G 5/0039; G08G 5/0043; G08G 5/003; G08G 5/0034; G06Q 10/06312; G06Q 10/0631; G06Q 50/30; G06Q 10/00; G06Q 10/06; G06Q 10/02; G06Q 10/025; G01C 23/00

See application file for complete search history.

(56) References Cited

U.S. PATENT DOCUMENTS

| | | | |
|---|---|---|---|
| 8,694,184 B1 * | 4/2014 | Boorman | G01C 23/00 340/945 |
| 9,862,501 B2 * | 1/2018 | Small | G06Q 10/00 |
| 2004/0039614 A1 * | 2/2004 | Maycotte | G06Q 10/02 705/5 |

(Continued)

OTHER PUBLICATIONS

Wiesemann et al., An integrated operations solution for gate-to-gate airline operations, 2011, IEEE, p. 1-12 (Year: 2011).*

*Primary Examiner* — McDieunel Marc
(74) *Attorney, Agent, or Firm* — Joseph M Butscher; The Small Patent Law Group, LLC (57) ABSTRACT

A flight schedule disruption awareness system is configured to provide situational awareness of flight disruptions that affect a flight schedule for one or more flights. The flight schedule disruption awareness system includes a disruption determination control unit that is configured to receive a plurality of flight schedule update inputs related to flight schedule updates to the flight schedule. The disruption determination control unit determines one or more flight disruptions from the plurality of flight schedule update inputs. A display is operatively coupled to the disruption determination control unit. The disruption determination control unit shows delays caused by the flight disruption(s) on the display.

20 Claims, 5 Drawing Sheets

(56) References Cited

U.S. PATENT DOCUMENTS

| | | | |
|---|---|---|---|
| 2008/0010004 A1* | 1/2008 | Small | G08G 5/00 701/120 |
| 2008/0010005 A1* | 1/2008 | Small | G08G 5/00 701/120 |
| 2008/0010107 A1* | 1/2008 | Small | G06Q 10/06 705/1.1 |
| 2008/0046167 A1* | 2/2008 | Small | G06Q 10/00 701/120 |
| 2012/0218127 A1* | 8/2012 | Kroen | G08G 5/0034 340/945 |
| 2016/0093218 A1* | 3/2016 | Hale | G08G 5/003 701/120 |
| 2016/0093219 A1* | 3/2016 | Bailey | G08G 5/0013 701/120 |
| 2016/0093221 A1* | 3/2016 | Bailey | G08G 5/0039 701/120 |
| 2016/0093222 A1* | 3/2016 | Hale | G08G 5/0039 701/120 |
| 2018/0012152 A1* | 1/2018 | Arguello | G06Q 10/025 |

* cited by examiner

FLIGHT SCHEDULE DISRUPTION AWARENESS SYSTEMS AND METHODS

FIELD OF THE DISCLOSURE

Embodiments of the present disclosure generally relate to systems and methods for improving situational awareness of flight operations disruptions that affect a flight schedule, and, more particularly, to systems and methods for determining and displaying integrated flight operations disruptions.

BACKGROUND OF THE DISCLOSURE

Aircraft are used to transport passengers between various locations. Numerous aircraft depart from and arrive at a typical airport every day.

An integrated set of flight operations schedules sets departure times and arrival times for flights between airports. For various reasons, however, the flight operations schedules may need to be revised, due to disruptions that affect arrival and/or departure times for aircraft. For example, incoming and departing flights may be delayed due to inclement weather. As another example, a flight may be delayed due to a crew delay, such as may be caused by a scheduled flight crew for one particular flight being delayed on a leg of a previous flight. As another example, a departing flight may be delayed due to maintenance issues.

Various delays may or may not cause a flight disruption. For example, a four hour maintenance delay typically will not affect a next scheduled departure time for a flight that is scheduled eight hours later. As such, the delay is not considered a flight disruption. A flight operation delay is disruptive if it affects a scheduled arrival or departure time for one or more flights in excess of a disruption threshold limit. As an example, a crew delay of an hour may cause a flight disruption in that it delays a scheduled departure of a flight by a particular amount of time (such as a flight delay of half an hour) that is beyond the disruption threshold limit (such as twelve minutes).

Typically, one or more individuals at an operations center (such as air airline operations personnel) analyze numerous delays to determine whether or not such delays cause flight disruptions. Accordingly, the individual(s) typically analyzes a delay(s) to determine how the delay(s) affects scheduled flight times. For example, a flight arrival delay of thirty minutes for a particular flight may or may not cause a disruption to any other flights. In order to determine whether the flight arrival delay causes a disruption to another flight, the individual(s) at the operations center analyzes the flight arrival delay in relation to one or more other scheduled flights. The analysis includes all of the scheduled resources for the delayed flight (such as the particular aircraft, flight and cabin crew, maintenance, passenger connections, airport catering, fuel lavatory, baggage gate, slot time, etc.), as well as for the next use of each of those resources.

As can be appreciated, such complex disruption assessments may not be able to be conducted within a reasonable time to implement sufficient recovery action. That is, the analysis is typically labor intensive, and may take up a relatively long period of time, thereby reducing a possibility for an alternate plan that could otherwise alleviate the disruption. There may be limited time available to implement a recovery action, and there may be multiple delays to be analyzed separately and/or together.

Moreover, delays frequently occur through operational delays, so by the time a determination is made, another delay may have occurred that negates the original analysis. In short, delays cannot be analyzed in isolation. Rather, the set of all active delays are continually analyzed by one or more individuals at a flight operations center, thereby yielding a complex, complicated, and time- and labor-intensive process.

SUMMARY OF THE DISCLOSURE

A need exists for a system and method of improving situational awareness of flight disruptions (for example, flight operations schedule disruptions). Further, a need exists for a system and method of identifying multiple elements that may impact or cause flight disruptions in order to allow for quick and efficient decisions by operations staff.

With those needs in mind, certain embodiments of the present disclosure provide a flight schedule disruption awareness system that is configured to provide situational awareness of flight disruptions that affect a flight schedule for one or more flights. The flight schedule disruption awareness system includes a disruption determination control unit that is configured to receive a plurality of flight schedule update inputs related to flight schedule updates to the flight schedule. The disruption determination control unit determines one or more flight disruptions from the plurality of flight schedule update inputs.

In at least one embodiment, a display is operatively coupled to the disruption determination control unit. The disruption determination control unit shows delays caused by the flight disruption(s) on the display. The disruption determination control unit may refrain from showing additional delays that do not cause one or more flight disruptions.

The display may provide at least one flight area for at least one flight that is scheduled to arrive at or depart from an airport. The flight area may include a plurality of designated delay areas including an arrival delay area, a departure delay area, a crew delay area, and a maintenance delay area. In at least one embodiment, the display provides a plurality of flight areas for a plurality of flights that are scheduled to arrive at and depart from the airport.

The disruption determination control unit may provide a plurality of priority indicia for one or more flight disruptions. The plurality of priority indicia provide a visual indication of a length of one or more flight disruptions. In at least one embodiment, the plurality of priority indicia include color codes.

The plurality of flight schedule update inputs may include crew delay inputs representative of one or more crew delays for one or more particular flights, maintenance delay inputs representative of one or more maintenance delays for the particular flight(s), arrival delay inputs representative of one or more arrival delays for the particular flight(s), and/or departure delay inputs representative of one or more departure delays for the particular flight(s).

Certain embodiments of the present disclosure provide a flight disruption awareness method that is configured to provide situational awareness of flight disruptions that affect a flight schedule for one or more flights. The flight disruption awareness method includes receiving a plurality of flight schedule update inputs related to flight schedule updates to the flight schedule by a flight disruption determination control unit, and determining, using the flight disruption determination control unit, one or more flight disruptions from the plurality of flight schedule update inputs.

In at least one embodiment, the method also includes operatively coupling a display to the disruption determination control unit, and showing (on the display) delays caused by the one or more flight disruptions.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide flight schedule disruption awareness systems and methods. The systems and methods are configured to assess flight schedule disruptions (for example, aircraft arrival/departure changes, crew delays, maintenance delays, and the like) in relation to an integrated set of schedules.

The systems and methods provide real time or near-real time analysis of an integrated set of schedules in relation to a scheduled event (such as an originally-scheduled flight departure time). The systems and methods analyze various flight disruptions and provide summary presentations, which show one or more events that cause flight disruptions.

Certain embodiments of the present disclosure provide a system and method that are used to improve situational awareness of flight disruptions by evaluating two or more flight disrupting elements. A display of schedule disrupting events provides a time impact of one or more disrupting events. The display may show priority evaluations to allow for an efficient assessment of whether a delay is only a delay for a particular flight, or if the delay is a schedule disrupting event that affects other aircraft. The systems and methods may analyze events across an airline fleet of aircraft in order to provide a comprehensive view of disrupting events and impacts, thereby improving operations by identifying an overall impact of disruptions.

As used herein, an aircraft may be any fixed- or rotary-winged vehicle capable of flight, being piloted, remotely piloted or operating autonomously, for example. As used herein, an airport is any location where an aircraft is capable of landing, such as a commercial or military airport or helipad, private or public airstrip, ship, field, park, driveway, or the like. As used herein, a delay is any actual or predicted, positive or negative deviation in time from the current schedule. As used herein, a disruption is any delay that exceeds a specified threshold value (for example, a crew disruption may have a different threshold value than a maintenance disruption).

Figure 1:
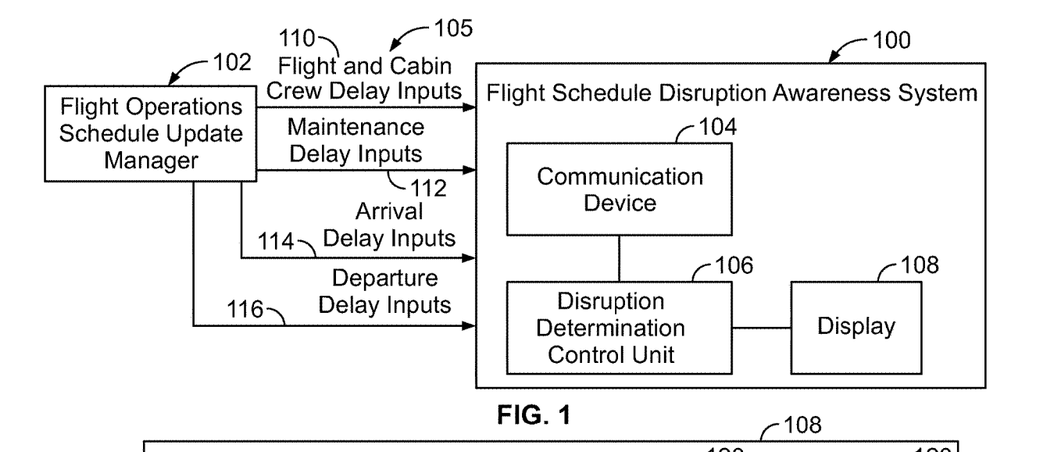
FIG. 1 is a simplified box diagram of a flight schedule disruption awareness system in communication with a flight operations schedule update manager, according to an exemplary embodiment of the present disclosure.

FIG. 1 is a simplified box diagram of a flight schedule disruption awareness system 100 in communication with a flight operations schedule update manager 102, according to an exemplary embodiment of the present disclosure. The flight schedule disruption awareness system 100 includes a communication device 104 that receives various flight schedule update inputs 105 (for example, flight operations schedule update inputs) from the flight operations schedule update manager 102. The communication device 104 is communicatively coupled to a disruption determination control unit 106, such as through one or more wired or wireless connections. The disruption determination control unit 106 is also communicatively coupled to a display 108 through one or more wired or wireless connections.

The communication device 104 may be configured to receive schedule updates and delay updates. The communication device 104 may be a single communication device that receives both the schedule updates and the delay updates. Optionally, the communication device 104 may include a first component that receives the schedule updates, and a second component that receives the delay updates.

The communication device 104 may be one or more components that are configured to receive the flight schedule update inputs 105 (for example, flight operations schedule update inputs) from the flight operations schedule update manager 102. For example, the communication device 104 may be a port of a computing system that is coupled to an input device (such as a keyboard, mouse, or the like) of the flight operations schedule update manager 102 that allows the flight schedule update inputs 105 to be directly input into the flight schedule disruption awareness system 100. In at least one other embodiment, the communication device 104 may be an antenna, transceiver, radio unit, and/or the like that is configured to receive wireless flight schedule update inputs 105 that are broadcast from the flight operations schedule update manager 102. As another example, the communication device 104 may be or include a modem, Ethernet connection, wireless interface, and/or the like that is in communication with the flight operations schedule update manager 102 through a private or public communication system, such as the Internet.

The flight operations schedule update manager 102 may be or include a computing system that receives various flight schedule (for example, flight operations schedule) updates regarding flight departures, arrivals, maintenance, passengers, airport resources, and/or the like in relation to one or more airports. In at least one embodiment, the flight operations schedule update manager 102 may be or include a central communication hub that receives and compiles various flight schedule updates. In at least one other embodiment, the flight operations schedule update manager 102 may be a computing system that is .operated by an individual who receives various flight schedule updates and inputs the updates into the flight operations schedule update manager 102.

The flight operations schedule update manager 102 communicates the flight schedule updates to the flight schedule disruption awareness system 100 as the flight schedule update inputs 105. The flight schedule update inputs 105 includes flight and cabin crew delay (for example, schedule change) inputs 110, maintenance delay (for example, schedule change) inputs 112, arrival delay (for example, schedule change) inputs 114, departure delay (for example, schedule change) inputs 116, and/or the like. Other flight schedule update inputs 105 include airport fuel schedule change inputs, airport lavatory service schedule change inputs, airport gate availability schedule change inputs, airport takeoff slot assignment schedule change inputs, airport baggage service schedule change inputs, airport cargo schedule change inputs, etc. A schedule change is an example of a possible delay, and is therefore part of a delay input, whether or not the schedule change delays a flight or not.

A crew delay input 110 represents a crew delay for a particular aircraft and/or relative to a particular crew schedule. The crew delay may be caused by a late-arriving crew (such as a pilot, co-pilot, flight attendants, and/or the like) for a particular flight. For example, the crew delay input 110 may represent a new crew schedule, as an overlay or delta. The crew schedule change may be caused by recovery activity from an earlier delay.

A maintenance delay input 112 represents a maintenance delay in relation to a maintenance schedule, such as for a particular aircraft. The maintenance delay may be caused by a newly-discovered maintenance issue for a particular aircraft, which may be out of service, (such as a mechanical or electrical issue) that needs to be remedied before the aircraft may depart from an airport and/or return to service. For example, the maintenance delay input 112 may represent a new maintenance schedule, as an overlay or delta. The maintenance schedule change may be caused by recovery activity from an earlier delay.

An unscheduled maintenance delay input represents an aircraft being taken out of service relative to a current aircraft assignment schedule. The unscheduled maintenance delay may be caused by a newly-discovered maintenance issue for a particular in-service aircraft (such as a mechanical or electrical issue) that needs to be remedied before the aircraft may return to service.

An arrival delay input 114 represents an arrival delay for a particular aircraft in relation to an airport. The arrival delay may be caused by inclement weather, air traffic congestion, and/or the like that may prevent an inbound flight from arriving at the airport at a scheduled arrival time. For example, an arrival delay input 114 may represent a new flight arrival schedule, as an overlay or delta. The arrival schedule change may be caused by recovery activity from an earlier delay.

A departure delay input 116 represents a departure delay for a particular aircraft in relation to an airport. The departure delay may be caused by inclement weather, air traffic congestion, and/or the like that may prevent an outbound flight from departing from the airport at a schedule arrival time. For example, a departure delay input 116 may represent a new flight departure schedule, as an overlay or delta. The departure schedule change may be caused by recovery activity from an earlier delay.

An airport fuel delay input (not shown) represents a new airport fuel schedule, as an overlay or delta. The airport fuel schedule change may be caused by recovery activity from an earlier delay.

An airport lavatory service delay input (not shown) represents a new airport lavatory schedule, as an overlay or delta. The airport lavatory schedule change may be caused by recovery activity from an earlier delay.

An airport gate availability delay input (not shown) represents the new airport gate schedule, as an overlay or delta. The airport gate schedule change may be caused by recovery activity from an earlier delay.

An airport takeoff slot assignment delay input (not shown) represents the airport takeoff slot assignment crew schedule, as an overlay or delta. The airport takeoff slot assignment schedule change may be caused by recovery activity from an earlier delay.

An airport baggage service delay input (not shown) represents a new airport baggage service schedule, as an overlay or delta. The airport baggage service schedule change may be caused by recovery activity from an earlier delay.

An airport cargo delay input (not shown) represents a new airport cargo service schedule, as an overlay or delta. The airport cargo schedule change may be caused by recovery activity from an earlier delay.

Each of the flight schedule update inputs 105 that are communicated by the flight operations schedule update manager 102 to the flight schedule disruption awareness system 100 represents events or elements that may or may not cause a flight schedule disruption, such as in relation to aircraft that are scheduled to arrive or depart in relation to the airport. The event or element causes a flight schedule disruption if a scheduled arrival or departure time that is originally scheduled is affected (that is, changed), such as beyond a threshold value, as determined by the disruption determination control unit 106.

The flight schedule disruption awareness system 100 receives the flight schedule update inputs 105 (including the delay inputs) from the flight operations schedule update manager 102 (which may include a delay manager) via the communication device 104. The disruption determination control unit 106 analyzes the flight schedule update inputs 105 to determine whether or not events represented by the flight schedule update inputs 105 cause flight schedule disruptions. If the events do not cause flight schedule disruptions, the disruption determination control unit 106 refrains from showing the events on the display 108. When the events cause flight schedule disruptions, the disruption determination control unit 106 shows the disruption (for example, the disrupting events) on the display 108.

The disruption determination control unit 106 aggregates a plurality of disruptions (for example, disruptive events) for one or more flights and shows them in an integrated, summary presentation on the display 108. As such, an individual (such as an airline operations controller) may view the integrated, summary presentation of the disruptive events on the display 108 in order to efficiently determine possible flight operations delays for an aircraft and/or a fleet of aircraft. In this manner, the individual may quickly and efficiently assess the situation, determine contingency plans and/or alternate plans for alleviating the flight schedule disruptions.

Figure 2:
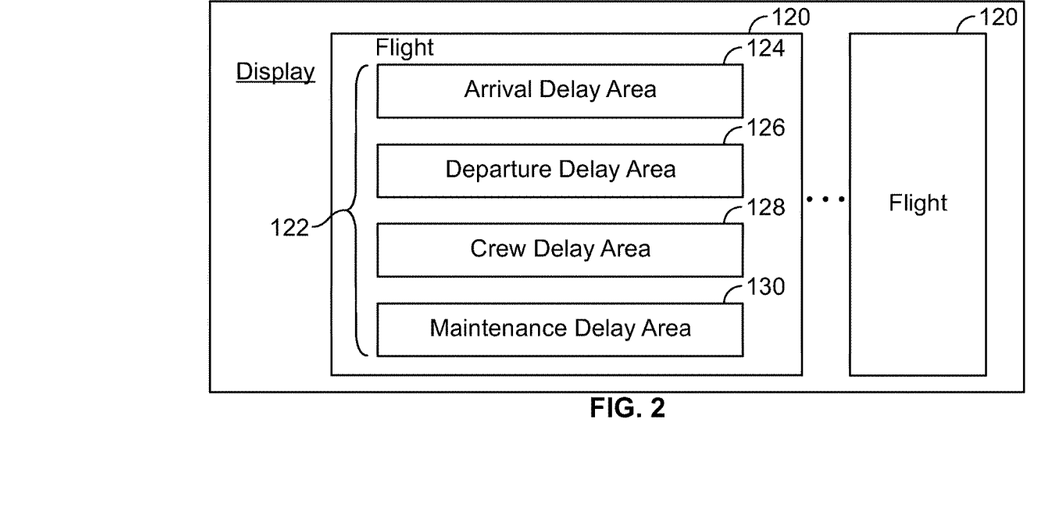
FIG. 2 is a simplified box diagram of a display of a flight schedule disruption awareness system, according to an exemplary embodiment of the present disclosure.

FIG. 2 is a simplified box diagram of the display 108 of the flight schedule disruption awareness system 100, according to an exemplary embodiment of the present disclosure. In at least one embodiment, the display 108 is a monitor that is configured to electronically show graphics, videos, and/or the like. For example, the display 108 may be a liquid crystal display (LCD) screen, a light-emitting diode (LED) screen, a cathode ray tube screen, a plasma screen, a computer monitor, and/or the like.

The display 108 provides flight areas 120 (such as electronic windows, pop-ups, or other such defined screen areas), such as flight operations schedule disruption areas, for one or more flights that are scheduled to arrive at and/or depart from an airport. Optionally, the display may provide a flight area 120 for a single flight that is scheduled to arrive at or depart from the airport.

The flight area 120 may include a plurality of designated delay areas 122 (for example, flight operations delays areas). For example, the flight area 120 may include an arrival delay area 124, a departure delay area 126, a crew delay area 128, and a maintenance delay area 130. The arrival delay area 124 indicates delays in arrival of a flight. The departure delay area 126 indicates delays in departure of a flight. The crew delay area 128 indicates crew delays for a flight. The maintenance delay area 130 indicates maintenance delays for a flight.

Referring to FIGS. 1 and 2, the disruption determination control unit 106 shows delays (for example, flight operations schedule disruptions) for one or more flights in the designated delay areas 122 for each particular flight. In at least one embodiment, the disruption determination control unit 106 may show all delays in the designated delay areas 122, even if the delays do not cause at least one flight schedule disruption. In at least one other embodiment, the disruption determination control unit 106 may show only delays in the designated delay areas 122 that cause at least one flight schedule disruption. As an example, the designated delay areas 122 may always be shown, and if no delay is caused by a crew delay, the crew delay area 128 may simply show "No Delay," or "0 minutes." As another example, if there is no delay caused by, for example, a crew delay, the disruption determination control unit 106 may not even show the crew delay area 128. In general, the disruption determination control unit 106 is configured to show time impacts of each disrupting event in the designated delay areas 122.

As described, the disruption determination control unit 106 determines that a delay disrupts a flight schedule (and shows the disruption on the display 108). A disruption is measured against a current flight schedule (for example, a current flight operations schedule). When various events change (whether disruptive events or non-disruptive vents), an existing disruption may become moot, and new disruptions may be created. As such, the flight schedule disruption awareness system 100 may continually monitor events and update a flight schedule based on changing circumstances.

The flight schedule disruption awareness system 100 is configured to determine and display multiple factors and their relation to various delays that may affect a flight schedule for an airport. The flight schedule disruption awareness system 100 displays multiple delays in a way that improves situational awareness for airline operations staff. For example, an operations manager may view the display 108, and take an action or initiate an action for evaluation. The individual may then see on the display 108 that by taking/initiating an action (such as, for example moving a cabin crew from one flight to another flight), a particular aircraft may be able to depart within a certain time period with no additional adverse impact. In contrast, a different action may impact other flights that would then be displayed on the display 108. Overall, the flight schedule disruption awareness system 100 is configured to show multiple impacts to scheduled flights and the impact of one or more changes in relation to multiple aspects of the scheduled flights.

The flight schedule disruption awareness system 100 may be located at an airport. In at least one other embodiment, the flight schedule disruption awareness system 100 may be located at a central monitoring location that is remotely located from the airport. In at least one other embodiment, the flight schedule disruption awareness system 100 may be onboard an aircraft. The flight schedule disruption awareness system 100 may be centrally located at an operations control center, or may be located at s particular airport, station, hub, and/or the like, thereby allowing the station or hub operations manager to be aware of flights that are within their control.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the disruption determination control unit 106 may be or include one or more processors that are configured to control operation of the flight schedule disruption awareness system 100, as described above.

The disruption determination control unit 106 is configured to execute a set of instructions that are stored in one or more data storage units or elements (such as one or more memories), in order to process data. For example, the disruption determination control unit 106 may include or be coupled to one or more memories. The data storage units may also store data or other information as desired or needed. The data storage units may be in the form of an information source or a physical memory element within a processing machine.

The set of instructions may include various commands that instruct the disruption determination control unit 106 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the disruption determination control unit 106. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the disruption determination control unit 106 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
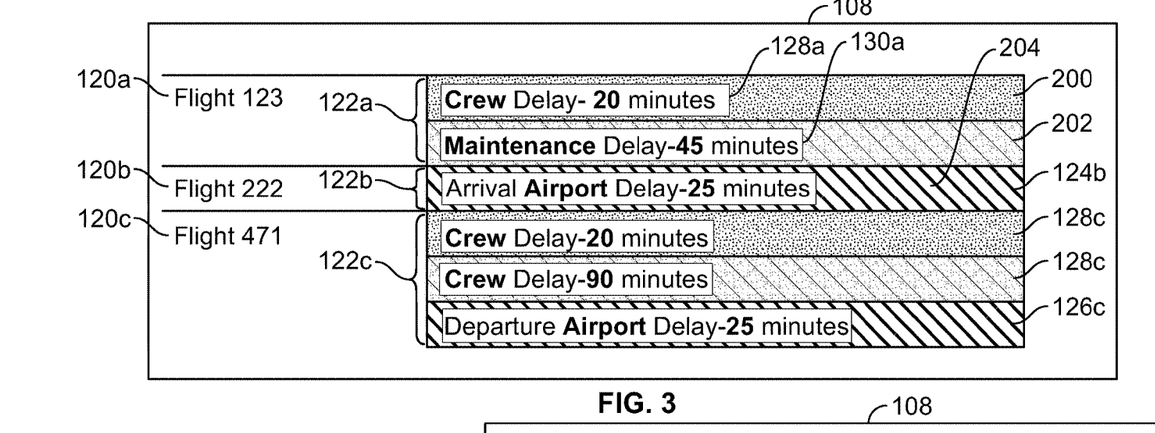
FIG. 3 is a front view of a display of a flight schedule disruption awareness system, according to an exemplary embodiment of the present disclosure.

FIG. 3 is a front view of a display 108 of the flight schedule disruption awareness system 100, according to an exemplary embodiment of the present disclosure. The display 108 designates flights 120a, 120b, and 120c that are part of a flight schedule for an airport. The display 108 may show more or less flights than shown. For example, the display 108 may show one, more, and/or all flights that are scheduled to arrive and/or depart from the airport, a region, and/or globally within a predetermined time period, such as an hour, 2 hours, 3 hours, an entire day, and/or the like.

As shown, in FIG. 3, the display 108 may show only the delays that cause flight schedule disruptions. For example, a crew delay of 20 minutes and a maintenance delay of 45 minutes are shown, respectively, in the crew delay area 128a and the maintenance delay area 130a for the flight 120a. Similarly, an arrival delay of 25 minutes is shown in the arrival delay area 124b for the flight 120b. Further, a crew delay of 20 minutes, a crew delay of 90 minutes, and a departure delay of 25 minutes are shown, respectively, in the crew delays areas 128c and the departure delay area 126c for the flight 120c.

The designated delays areas 122a, 122b, and 122c may be shown as horizontal bars. Referring to FIGS. 1 and 3, the disruption determination control unit 106 may order the various delays as they are received from the flight operations schedule update manager 102. In at least one other embodiment, the disruption determination control unit 106 may order the delays based on priority, such as that the longer delays are shown above shorter delays, or vice versa. Further, the disruption determination control unit 106 may provide priority indicia 200, 202, and 204 that provide a visual indication of the length of the delay. A low priority indicia 200 may be indicative of a relatively short delay, a high priority indicia 202 may be indicative of a relatively long delay, while a medium priority indicia 204 may be indicative of a delay that is between the relatively short delay and the relative long delay. In at least one embodiment, the indicia 200, 202, and 204 are colors. In at least one embodiment, the priority indicia may be color codes. For example, the low priority indicia 200 may be yellow, the high priority indicia 202 may be red, while the medium priority indicia 204 may be orange. In at least one other embodiment, the indicia may be symbols (such as shapes), graphics, text, and/or the like. For example, a low priority indicia may be "L," a high priority indicia may he "H," while a medium priority indicia may be "M." As another example, the indicia may be graphical clocks showing the length of the delays. As another example, the indicia may be bars that show the length of the delays. The indicia 200, 202, and 204 may be associated with the particular delays, and/or the flights 120a, 120b, and 120c (for example, the text of the flights 120a, 120b, and 120c may be color-coded based on priority indicia).

Figure 4:
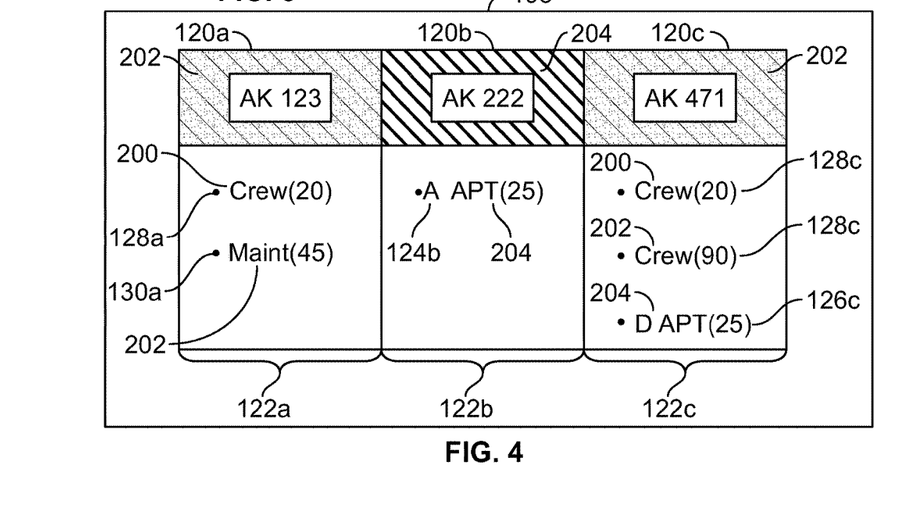
FIG. 4 is front view of a display of a flight schedule disruption awareness system, according to an exemplary embodiment of the present disclosure.

FIG. 4 is front view of a display 108 of the flight schedule disruption awareness system 100, according to an exemplary embodiment of the present disclosure. The embodiment shown in FIG. 4 is similar to that shown in FIG. 3. As shown in FIG. 4, the designated delays areas 122a, 122b, and 122c may be shown as vertical columns.

Figure 5:
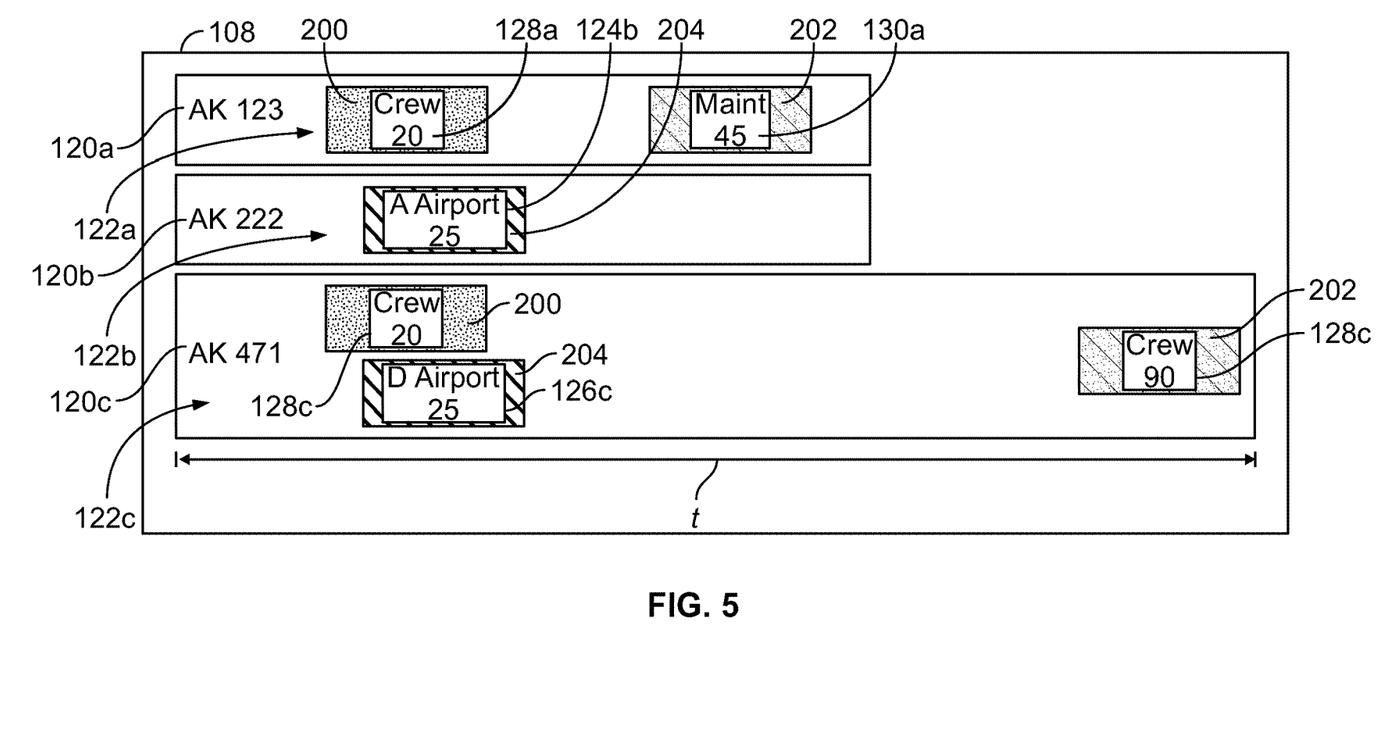
FIG. 5 is front view of a display of a flight schedule disruption awareness system, according to an exemplary embodiment of the present disclosure.

FIG. 5 is front view of a display 108 of the flight schedule disruption awareness system 100, according to an exemplary embodiment of the present disclosure. The embodiment shown in FIG. 5 is similar to those shown in FIGS. 3-4. As shown in FIG. 5, the designated delays areas 122a, 122b, and 122c may be shown in relation to a time axis t that spaces the delays relative to one another, thereby giving an individual viewing the display 108 a readily apparent indication of which delays are short, medium, and long.

Figure 6:
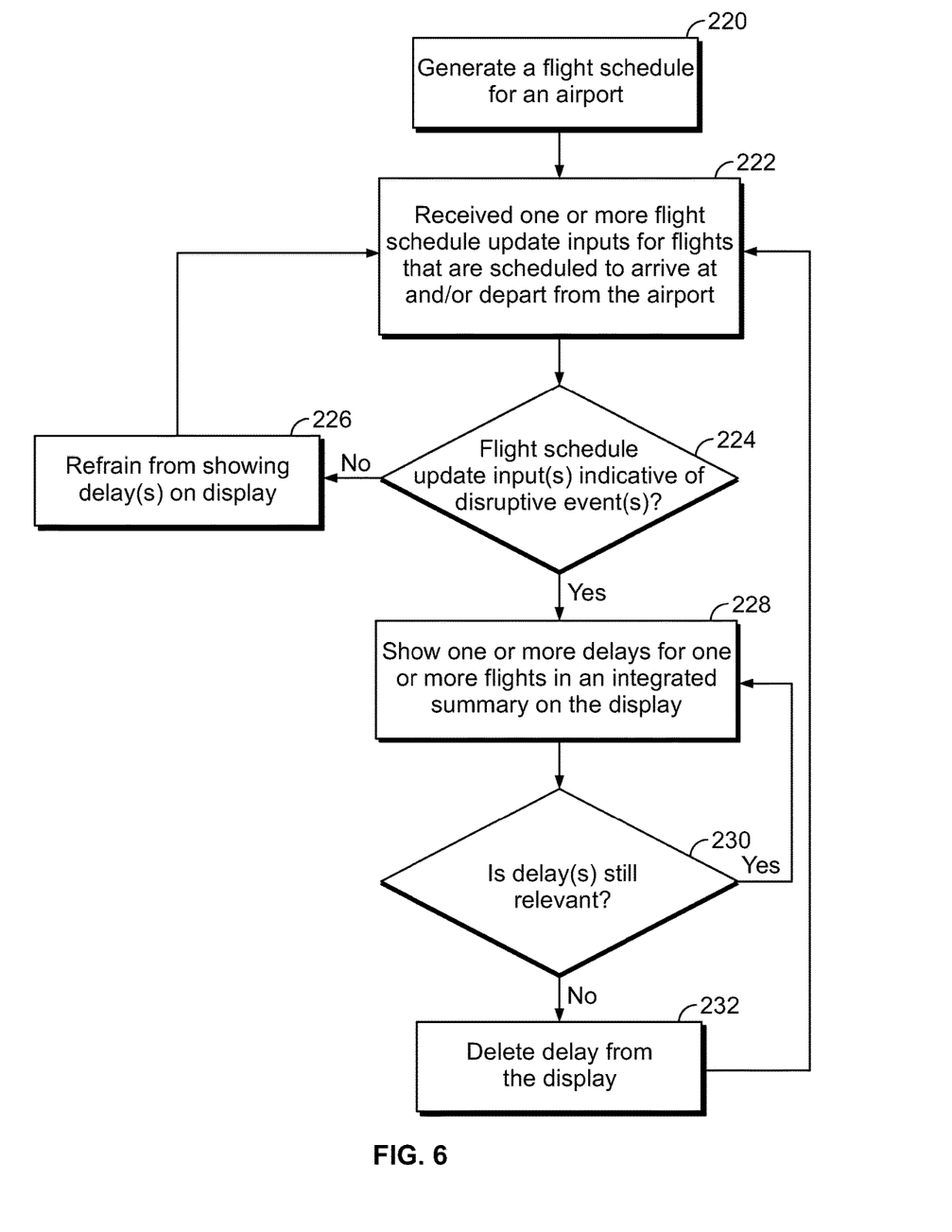
FIG. 6 is a flow chart of a flight disruption awareness method, according to an exemplary embodiment of the present disclosure.

FIG. 6 is a flow chart of a flight disruption awareness method, according to an exemplary embodiment of the present disclosure. Referring to FIGS. 1 and 6, the method begins at 220, at which a flight schedule (such as for an airport) is generated. At 222, the flight schedule disruption awareness system 100 receives one or more flight schedule update inputs 105 for flights that are scheduled to arrive at and/or depart from the airport.

At 224, the flight schedule disruption awareness system determines if the flight schedule update input(s) 105 are indicative of one or more disruptive events that disrupt the flight schedule. If the flight schedule update input(s) 105 is not indicative of at least one disruptive event, the method proceeds to 226, at which the flight schedule disruption awareness system 100 refrains from showing a delay(s) on the display 108.

If, however, the flight schedule update input(s) is indicative of at least one disruptive event at 224, the method proceeds to 228, at which the disruption determination control unit 106 shows one or more delays for one or more flights in an integrated summary on the display 108.

At 230, the disruption determination control unit 106 determines if the delay(s) is still relevant. The delay is still relevant if the delay has not be alleviated, such as through an alternate flight, crew, maintenance option, and/or the like. The delay is no longer relevant if the delay has been alleviated or otherwise rendered moot. If the delay is still relevant at 230, the method returns to 228.

If, however, the delay is no longer relevant at 230, the method proceeds to 232, at which the disruption determination control unit 106 delates the delay from the display 108. The method then returns to 222.

Figure 7:
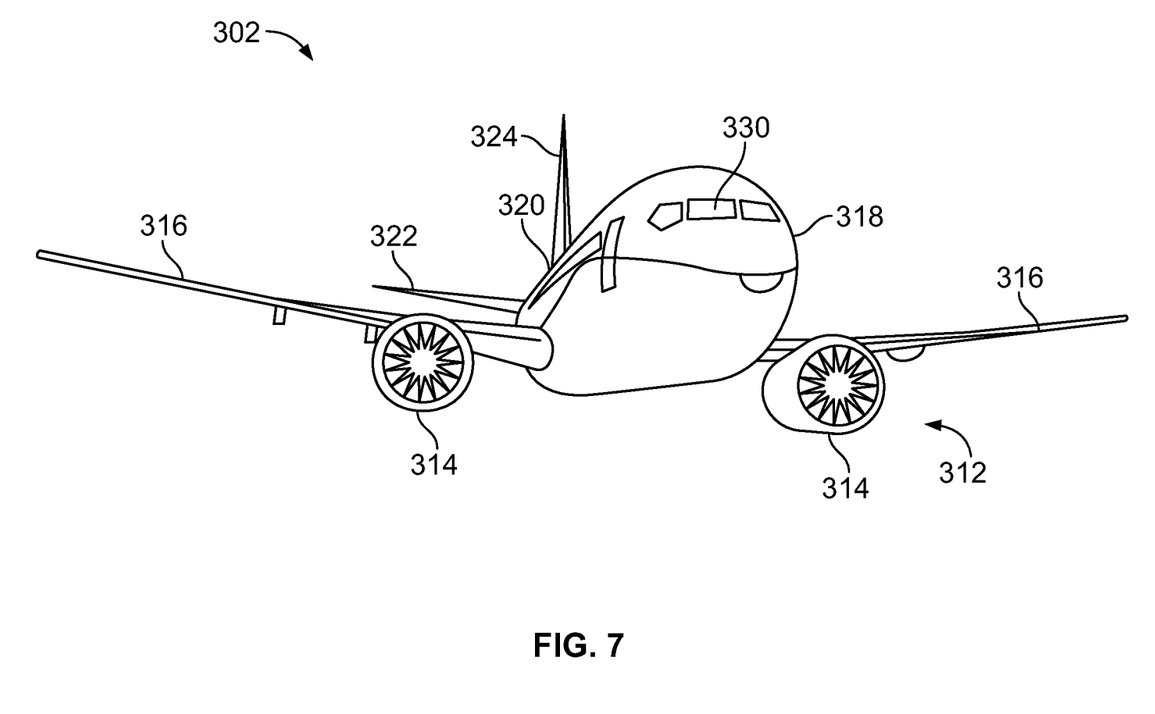
FIG. 7 is a diagrammatic representation of a front perspective view of an aircraft, according to an exemplary embodiment of the present disclosure.

FIG. 7 is a diagrammatic representation of a front perspective view of an aircraft 302, according to an exemplary embodiment of the present disclosure. The aircraft 302 includes a propulsion system 312 that may include two turbofan engines 314, for example. Optionally, the propulsion system 312 may include more engines 314 than shown. The engines 314 are carried by wings 316 of the aircraft 302. In other embodiments, the engines 314 may be carried by a fuselage 318 and/or an empennage 320. The empennage 320 may also support horizontal stabilizers 322 and a vertical stabilizer 324. The fuselage 318 of the aircraft 302 defines an internal cabin, which may include a cockpit 330, one or more work sections (for example, galleys, personnel carry-on baggage areas, and the like), one or more passenger sections (for example, first class, business class, and coach sections), and an aft section in which an aft rest area assembly may be positioned.

Referring to FIGS. 1-7, embodiments of the present disclosure provide systems and methods that allow large amounts of data to be quickly and efficiently analyzed by a computing device. For example, numerous aircraft may be scheduled to arrive at and/or depart from an airport. As such, large amounts of data are being tracked and analyzed. The vast amounts of data are efficiently organized and/or analyzed by the flight schedule disruption awareness system 100, as described above. The flight schedule disruption awareness system 100 analyzes the data in a relatively short time in order to quickly and efficiently output and/or display various delays for the various aircraft that are scheduled to arrive at and/or depart from one or more airports. For example, the flight schedule disruption awareness system 100 analyzes current flight data, flight schedule update inputs 105 and outputs delay for the various aircraft in real time. A human being would be incapable of efficiently analyzing such vast amounts of data in such a short time. As such, embodiments of the present disclosure provide increased and efficient functionality with respect to prior computing systems, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

As described herein, embodiments of the present disclosure provide systems and methods of improving situational awareness of flight disruptions. Further, embodiments of the present disclosure provide systems and methods of identifying multiple elements that may impact or cause flight disruptions in order to allow for quick and efficient decisions by operations staff.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A flight schedule disruption awareness system that is configured to provide situational awareness of flight disruptions that affect a flight schedule for one or more flights, the flight schedule disruption awareness system comprising:
   a disruption determination control unit that is configured to receive a plurality of flight schedule update inputs related to flight schedule updates to the flight schedule, wherein the disruption determination control unit determines one or more flight disruptions from the plurality of flight schedule update inputs,
   wherein the disruption determination control unit provides a plurality of priority indicia for one or more flight disruptions, wherein the plurality of priority indicia provide a visual indication of a length of one or more flight disruptions.

2. The flight schedule disruption awareness system of claim 1, further comprising a display that is operatively coupled to the disruption determination control unit, wherein the disruption determination control unit shows delays caused by the one or more flight disruptions on the display.

3. The flight schedule disruption awareness system of claim 2, wherein the disruption determination control unit refrains from showing additional delays that do not cause one or more flight disruptions.

4. The flight schedule disruption awareness system of claim 2, wherein the display provides at least one flight area for at least one flight that is scheduled to arrive at or depart from an airport.

5. The flight schedule disruption awareness system of claim 4, wherein the at least one flight area comprises a plurality of designated delay areas including an arrival delay area, a departure delay area, a crew delay area, and a maintenance delay area.

6. The flight schedule disruption awareness system of claim 2, wherein the display provides a plurality of flight areas for a plurality of flights that are scheduled to arrive at and depart from an airport.

7. The flight schedule disruption awareness system of claim 1, wherein the plurality of priority indicia comprise color codes.

8. The flight schedule disruption awareness system of claim 1, wherein the plurality of flight schedule update inputs comprise one or more of:
  crew delay inputs representative of one or more crew delays for one or more particular flights;
  maintenance delay inputs representative of one or more maintenance delays for the one or more particular flights;
  arrival delay inputs representative of one or more arrival delays for the one or more particular flights; and
  departure delay inputs representative of one or more departure delays for the one or more particular flights.

9. The flight schedule disruption awareness system of claim 1, wherein the plurality of priority indicia comprises a low priority indicia indicative of a first delay of a first time period, a medium priority indicia indicative of a second delay of a second time period that exceeds the first time period, and a high priority indicia indicative of a third delay of a third period that exceeds the second time period.

10. A flight disruption awareness method that is configured to provide situational awareness of flight disruptions that affect a flight schedule for one or more flights, the flight disruption awareness method comprising:
  receiving a plurality of flight schedule update inputs related to flight schedule updates to the flight schedule by a flight disruption determination control unit;
  determining, using the flight disruption determination control unit, one or more flight disruptions from the plurality of flight schedule update inputs; and
  providing a plurality of priority indicia for one or more flight disruptions, wherein the plurality of priority indicia provide a visual indication of a length of one or more flight disruptions.

11. The flight disruption awareness method of claim 10, further comprising:
  operatively coupling a display to the disruption determination control unit; and
  showing, on the display, delays caused by the one or more flight disruptions.

12. The flight disruption awareness method of claim 11, further comprising refraining from showing additional delays that do not cause the one or more flight disruptions.

13. The flight disruption awareness method of claim 11, providing, on the display, at least one flight area for at least one flight that is scheduled to arrive at or depart from an airport.

14. The flight disruption awareness method of claim 13, wherein the at least one flight area comprises a plurality of designated delay areas including an arrival delay area, a departure delay area, a crew delay area, and a maintenance delay area.

15. The flight disruption awareness method of claim 11, further comprising providing, on the display, a plurality of flight areas for a plurality of flights that are scheduled to arrive at and depart from an airport.

16. The flight disruption awareness method of claim 10, wherein the plurality of priority indicia comprise color codes.

17. The flight disruption awareness method of claim 10, wherein the plurality of flight schedule update inputs comprise:
  crew delay inputs representative of one or more crew delays for one or more particular flights;
  maintenance delay inputs representative of one or more maintenance delays for the one or more particular flights;
  arrival delay inputs representative of one or more arrival delays for the one or more particular flights; and
  departure delay inputs representative of one or more departure delays for the one or more particular flights.

18. The flight disruption awareness method of claim 10, wherein the plurality of priority indicia comprises a low priority indicia indicative of a first delay of a first time period, a medium priority indicia indicative of a second delay of a second time period that exceeds the first time period, and a high priority indicia indicative of a third delay of a third period that exceeds the second time period.

19. A flight schedule disruption awareness system that is configured to provide situational awareness of flight disruptions that affect a flight schedule for a plurality of flights, the flight schedule disruption awareness system comprising:
  a disruption determination control unit that is configured to receive a plurality of flight schedule update inputs related to flight schedule updates to the flight schedule, wherein the disruption determination control unit determines one or more flight disruptions from the plurality of flight schedule update inputs; and
  a display that is operatively coupled to the disruption determination control unit,
  wherein the disruption determination control unit shows delays caused by the one or more flight disruptions on the display,
  wherein the disruption determination control unit refrains from showing additional delays that do not cause one or more flight disruptions,
  wherein the display comprises provides a plurality of flight areas for a plurality of flights that are scheduled to arrive at and depart from an airport,
  wherein the plurality of flight areas comprise a plurality of designated delay areas including an arrival delay area, a departure delay area, a crew delay area, and a maintenance delay area,
  wherein the disruption determination control unit provides a plurality of color-coded priority indicia for one or more flight disruptions, and
  wherein the plurality of color-coded priority indicia provide a visual indication of a length of one or more flight disruptions.

20. The flight schedule disruption awareness system of claim 19, wherein the plurality of flight schedule update inputs comprise:
  crew delay inputs representative of one or more crew delays for one or more particular flights;
  maintenance delay inputs representative of one or more maintenance delays for the one or more particular flights;
  arrival delay inputs representative of one or more arrival delays for the one or more particular flights; and
  departure delay inputs representative of one or more departure delays for the one or more particular flights.

\* \* \* \* \*